United States Patent
Blanchard

(10) Patent No.: US 8,528,017 B2
(45) Date of Patent: Sep. 3, 2013

(54) CARRIAGE OF CLOSED DATA THROUGH DIGITAL INTERFACE USING PACKETS

(75) Inventor: Robert Noel Blanchard, Escondido, CA (US)

(73) Assignee: Sony Corporation, Tokyo (JP)

(*) Notice: Subject to any disclaimer, the term of this patent is extended or adjusted under 35 U.S.C. 154(b) by 267 days.

(21) Appl. No.: 12/839,548

(22) Filed: Jul. 20, 2010

(65) Prior Publication Data

US 2012/0019716 A1    Jan. 26, 2012

(51) Int. Cl.
*G06F 3/00* (2006.01)
*H04N 7/16* (2011.01)

(52) U.S. Cl.
USPC .............................. 725/40; 725/136; 725/137

(58) Field of Classification Search
None
See application file for complete search history.

(56) References Cited

U.S. PATENT DOCUMENTS

| | | | |
|---|---|---|---|
| 6,430,357 B1* | 8/2002 | Orr | 386/244 |
| 7,050,109 B2 | 5/2006 | Safadi et al. | |
| 7,522,219 B2 | 4/2009 | Carlsgaard et al. | |
| 7,663,696 B2 | 2/2010 | Modi et al. | |
| 2005/0073608 A1 | 4/2005 | Stone et al. | |
| 2006/0101322 A1* | 5/2006 | Abbott et al. | 715/500.1 |
| 2008/0129864 A1* | 6/2008 | Stone et al. | 348/468 |
| 2010/0002134 A1 | 1/2010 | Eyer et al. | |
| 2010/0091187 A1 | 4/2010 | Topiwalla | |
| 2010/0165083 A1 | 7/2010 | Sasaki et al. | |
| 2010/0183278 A1* | 7/2010 | Black et al. | 386/52 |
| 2010/0188572 A1* | 7/2010 | Card, II | 348/468 |
| 2012/0023407 A1* | 1/2012 | Taylor | 715/731 |

* cited by examiner

*Primary Examiner* — Brian Pendleton
*Assistant Examiner* — Jean D Saint Cyr
(74) *Attorney, Agent, or Firm* — John L. Rogitz

(57) ABSTRACT

Closed caption (CC) data is carried across a digital interface such as HDMI by a source such as a set top box arrange CC data into a HDMI packet that is then transmitted, along with video packets, across the interface to a sink such as a TV. The CC data is kept in the same format that it was received and the TV's decoder processor processes the packets and renders CC text as if the CC data had been received by the tuner of the TV.

11 Claims, 2 Drawing Sheets sink logic

| Frame Rate | Frame Type | Caption Bytes |
|---|---|---|
| 24 or 23.97 | Progressive | 50 |
| 30 or 29.97 | Interlace | 20 |
| 30 or 29.97 | Progressive | 40 |
| 30 or 29.97 | Progressive | 60 |
| 60 or 59.94 | Progressive | 20 |
| 60 or 59.94 | Progressive | 40 |
| 60 or 59.94 | Progressive | 60 |

Figure 5 sink logic

CARRIAGE OF CLOSED DATA THROUGH DIGITAL INTERFACE USING PACKETS

I. FIELD OF THE INVENTION

The present application relates generally to carrying closed caption data through digital interfaces such as high definition multimedia interface (HDMI) using packets.

II. BACKGROUND OF THE INVENTION

In analog TVs, closed caption (CC) text was sent within the TV signals and processed and displayed on the TVs. This meant that viewers could use the TV remote control (RC) to establish CC settings, e.g., "on" or "off", as well as other CC-related settings.

With the advent of digital TV (DTV), however, no methods currently exist to carry CC data across digital interfaces (such as, e.g., HDMI) that now link multimedia sources such as set-top boxes with multimedia sinks such DTVs in a way that would permit the TV RC to be used to establish the CC settings. Instead, the source must integrate CC data in the TV signals (video) before sending the signals to the sink, meaning that the establishment of CC settings must be done by communicating with the source typically using a source RC (equivalently, by flipping between TV control and STB control using a single RC). Having to switch RCs or switch device control designation on a single RC is inconvenient and can be confusing to many viewers who typically require CC.

SUMMARY OF THE INVENTION

Accordingly, a multimedia source such as but not limited to a set top box includes a TV signal receiver that receives TV signals with closed caption (CC) data therein. A digital multimedia (DM) interface such as an HDMI interface is provided, and a processor receives signals from the TV signal receiver and communicates with a sink of multimedia content through DM interface. The processor executing logic which includes encapsulating the CC data in CC data packets containing no TV video (non-text video) data. The CC data packets are combined with multimedia packets containing video data and sent to the sink through the DM interface.

The DM interface can be a high definition multimedia interface (HDMI). In some aspects the processor may combine the CC data packets with the multimedia packets by interleaving the CC data packets in a stream of multimedia packets. In example embodiments a CC data packet can be correlated with an associated multimedia packet to which the CC data packet pertains by arranging the CC data packet immediately before or after the multimedia packet to which the CC data packet pertains in a stream of CC data packets and multimedia packets sent to the sink. In other examples a CC data packet can be correlated with an associated multimedia packet to which the CC data packet pertains by providing a pointer in the CC data packet to the multimedia packet to which the CC data packet pertains.

In another aspect, a sink such as but not limited to a TV for presenting multimedia data including video data includes a video display and a digital media (DM) interface which receives a stream of multimedia packets and closed caption (CC) packets from a source. A sink processor receives the stream and extracts the CC packets therefrom. The sink processor decodes the multimedia packets and presents on the display video represented by decoded multimedia packets. Also, the sink processor, responsive to commands from a user input device, selectively displays CC text derived from the CC packets on the display along with the video.

In some examples the sink processor receives a CC off command from the user input device and responsive thereto does not present CC text on the display along with the video. The sink processor can receive a CC on command from the user input device and responsive thereto present CC text on the display along with the video.

In another aspect, an assembly includes a tangible non-transitory computer readable storage medium bearing multimedia data structures representing video for presentation of the video on a display of a sink device. The medium also bears closed caption (CC) data structures. The CC data structures do not contain multimedia data but do contain information representing CC text that is to be presented on the display along with the video responsive to a user command received at the sink. A processor accesses the medium. When the medium and processor are in a source of multimedia the processor sources a stream of information including the CC data structures and multimedia packets representing the video to a sink through a digital media (DM) interface to a sink for presentation of the stream on the sink. The sink determines whether to present the CC text with the video responsive to user commands input to the sink. On the other hand, when the medium and processor are in a source of multimedia the processor receives a stream of information including the CC data structures and multimedia packets representing the video from the source through a digital media (DM) interface. The sink processor determines whether to present on a display the CC text with the video responsive to user commands input to the sink.

The details of the present invention, both as to its structure and operation, can best be understood in reference to the accompanying drawings, in which like reference numerals refer to like parts, and in which:

BRIEF DESCRIPTION OF THE DRAWINGS

FIG. 5 is a flow chart of example sink logic in accordance with present principles.

DETAILED DESCRIPTION OF THE PREFERRED EMBODIMENT

Figures 1, 2:
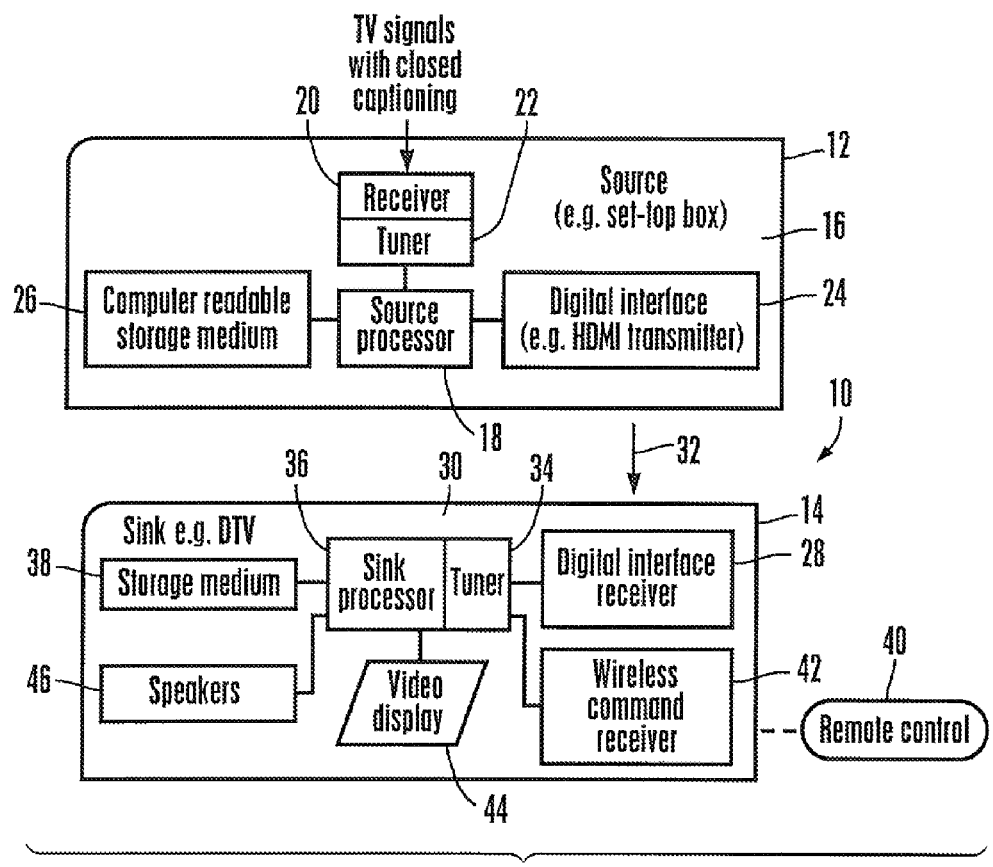
FIG. 1 is a block diagram of an example system in accordance with present principles.
FIG. 2 is a representation of an example data structure that can be used as a closed caption (CC) packet.

Referring initially to FIG. 1, a system 10 includes a source 12 of multimedia such as a set top box and a sink 14 such as a digital TV (DTV) to display the multimedia, although the source 12 may be embodied by other sources such as a satellite receiver or Internet interface receiving video in IP and the sink 14 may be embodied by, e.g., a game player, a video disk player, digital clock radio, mobile telephone, personal digital assistant, etc.

As shown in FIG. 1, the source 12, particularly when configured as a set top box, includes a portable lightweight plastic housing 16 bearing a digital source processor 18. The source processor 18 receives TV signals including video signals with closed caption (CC) data representing CC text from a receiver 20. In non-limiting examples a TV tuner 22 may be controlled by the source processor 18 to pass only TV signals on a tuned-to channel to the source processor 18. In any case, the source processor decodes the signal it receives and as described in greater detail below separates the CC data from the video, packetizes them separately and combines the packets in a stream, and sends the resultant stream through a digital media (DM) interface 24 to the sink 14. The DM interface 24 may be a HDMI interface. The source processor 18 may access a tangible non-transitory computer readable storage medium 26 such as solid state and/or disk-spaced storage for present purposes.

The sink 14 receives the stream from the source 12 at a sink DM interface 28 disposed in a sink housing 30. The stream is received over a wired or wireless link 32. The signal from the sink DM interface 28 may be sent through a TV tuner 34 to a sink processor 36 accessing a tangible non-transitory computer readable sink storage medium 38 such as solid state and/or disk-spaced storage for present purposes. The sink processor 34 controls the tuner 34 to tune to a demanded channel responsive to user command signals from a user input device 40 such as an infrared or rf remote control (RC), signals from which are received by a wireless command receiver 42 and sent to the sink processor 36. The sink processor 36 executes appropriate decoding and presents the video on a display 44, with audio in the stream being presented on one or more speakers 46. As set forth further below, the sink processor 36 also determines whether to decode and present CC data on the display 44 responsive to command signals sent from the TV RC 40 and received by the sink wireless command receiver 42. While the source 12 and sink 14 are shown in separate housings, in some implementations the source may be consolidated with the sink.

FIG. 2 shows an example CC data structure 48 that may establish an information data packet for carrying CC data, but not carrying video or audio data. Essentially, the CC data structure 48 contains information representing CC text that is to be presented on the display 44 along with the video responsive to a user command from the RC 40 received at the sink 14.

The CC data structure 48 is created at the source 12 based on CC information received by the source with the multimedia data. The data structures 48 and may be stored on the source storage medium 26 so that the source processor 18 may access the source medium 26 to source a stream of information including CC data structures and multimedia packets representing the video to the sink 14. Also, the CC data structure 48 may be received and stored on the sink storage medium 38 to be access by the sink processor 36, which determines whether to present on the display 44 the CC text with the video responsive to user commands from the RC 40 input to the sink 14.

In example data structure 48 shown in FIG. 2, the data structure 48 may include a frame type code field 50 that indicates what type of packet the packet 48 is. In this case, the frame type code indicates that packet is a CC data packet. If desired, a version number field 52 may also be included to indicate the version of the packet type.

Additionally, the example data structure 48 shown in FIG. 2 may include a field 54 indicating a number of bytes representing CC text in the CC data structure in the subsequent data field 56. The actual bytes representing the CC text may be contained in the data field 56. To indicate the end of the structure 48, an end byte field 58 may be provided as shown.

Figure 3:
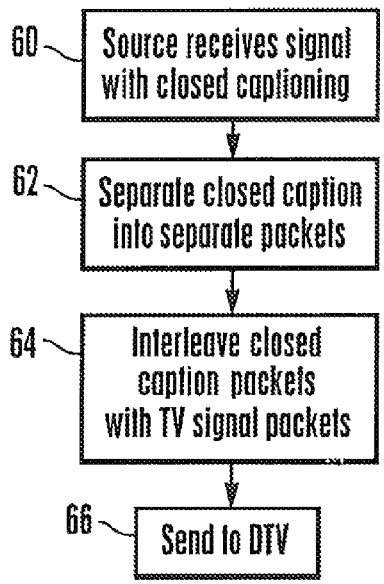
FIG. 3 is a table illustrating various non-limiting data block sizes of the CC packet for corresponding frame rates and types.

FIG. 3 indicates example non-limiting numbers of CC bytes that may be contained in a data field 54 of the data structure 48 depending on the frame rate and frame type. For example, for a 24 or 23.97 frame per second (fps) rate and a progressive frame type, the data field 56 may contain fifty CC data bytes. On the other hand, for a 30 or 29.97 fps rate and an interlaced frame type, the data field 56 may contain only twenty CC data bytes. Yet again, for a 30 or 29.97 fps rate and a progressive frame type, the data field 56 may contain forty or sixty CC data bytes, while for a 60 or 59.94 fps rate and a progressive frame type, the data field 56 may contain twenty, forty, or sixty CC data bytes. For higher frame rates the frequency and number of CC data bytes may be adjusted to correspond with the table above. For example, if the frame rate is 120 Hz, then every other frame can be a CC packet, i.e., between every video packet in a stream a CC packet may be interleaved.

Figure 4:
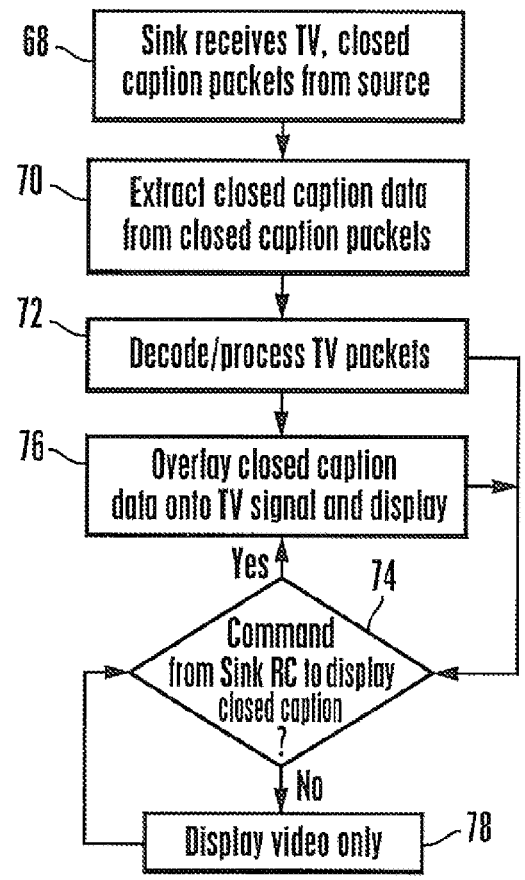
FIG. 4 is a flow chart of example source logic in accordance with present principles.

Now referring to FIG. 4, example logic executed by the source processor 18 may be appreciated. Commencing at block 60, a TV signal with CC data embedded therein is received by the source from, e.g., a cable head end. The signal undergoes appropriate decoding and at block 62 the CC data is separated from the video (and audio) and arranged in the data structures 48. The video with the CC data removed is uncompressed, and once uncompressed, the CC packets are interleaved with uncompressed video packets at block 64 to establish a stream, which is sent through the source DM interface 24 for appropriate encoding in accordance with the digital media protocol being used and transmission to the sink 14.

In one implementation, each CC data packet is correlated to one or more video packets to which it pertains as indicated by the signal received from, e.g., the cable head end. This correlation indicates the video frame or frames with which a particular CC text is to be presented. The source processor 18 thus knows the correlation from the signal it receives. In one example, the source processor propagates the CC-to-video correlation by arranging a CC data packet immediately before or after the multimedia packet to which the CC data packet pertains in the stream sent to the sink. In this way, the sink knows which video frame or frames on which to present the associated CC text, i.e., by simply presenting the CC text in the video frame immediately before or after the CC packet carrying the text.

In another example, the source processor propagates the CC-to-video correlation by providing a pointer in the CC data packet to the multimedia packet to which the CC data packet pertains. Thus, the data structure 48 shown in FIG. 2 may include a pointer filed that points to the associated video packet over which the CC text is to be superimposed.

Turning now to FIG. 5 for an understanding of example logic that the sink processor 36 can execute, at block 68 the stream of CC and video packets is received, decoded as appropriate in, e.g., the DM receiver 28, and then prior to uncompressing the video, the CC packets are extracted from the video packets at block 70. The CC packets may be at least temporarily stored on the sink storage medium 38. Any further decoding and processing of TV packets is undertaken at block 70, including uncompressing the video packets with the CC information having been removed.

In accordance with present principles, a viewer manipulating the RC 40 to signal the sink processor 36 (as opposed to signaling the source processor 18) can cause the sink processor 36 to establish desired CC settings. As but one example, the viewer can manipulate the RC 40 to navigate a CC user interface which presents the viewer with the option of turning CC on and off, i.e., with the option of causing the CC text to be presented on the display 44 along with the video or to present only video without the accompanying CC text. Other non-limiting example settings include CC language.

Decision diamond 74 thus simply indicates that responsive to the viewer manipulating the RC 40 to input a "CC on" command, the logic flows to block 76 to overlay the CC text represented in the CC packets onto the video presented on the display 44 or otherwise simultaneously present both the CC text and the video. It will readily be appreciated that the sink processor 36 uses whichever CC-to-video correlation has been established, e.g., the positional correlation of packets in the stream or the pointer-based correlation discussed above, to determine which video frames should be presented with which CC text. On the other hand, if the viewer selects "CC off" the logic moves to block 78 to present only video on the display 44 without any closed captioning. Thus, FIGS. 4 and 5 are cast in flow chart format for convenience and not by way of limitation, state diagrams being equally expressive for certain of the logic.

While the particular CARRIAGE OF CLOSED CAPTION DATA THROUGH DIGITAL INTERFACE USING PACKETS is herein shown and described in detail, it is to be understood that the subject matter which is encompassed by the present invention is limited only by the claims.

What is claimed is:

1. Sink for presenting multimedia data including video data comprising:
    video display;
    digital media (DM) interface configured for receiving a stream of multimedia packets and closed caption (CC) packets from a source;
    sink processor communicating with the DM interface for receiving the stream and extracting the CC packets therefrom;
    the sink processor configured for decoding the multimedia packets and presenting on the display video represented by decoded multimedia packets;
    the sink processor, responsive to commands from a user input device, configured for selectively displaying CC text derived from the CC packets on the display along with the video, the processor being configured for determining whether to present the CC text with the video responsive to user commands input to the sink, a first number of bytes being included in a CC data structure for a first combination of multimedia frame rate and frame type, a second number of bytes being included in a CC data structure for a second combination of multimedia frame rate and frame type.

2. The sink of claim 1, wherein the sink includes a TV tuner and is embodied by a TV.

3. The sink of claim 1, wherein the sink processor receives a CC off command from the user input device and responsive thereto does not present CC text on the display along with the video.

4. The sink of claim 3, wherein the sink processor receives a CC on command from the user input device and responsive thereto presents CC text on the display along with the video.

5. The sink of claim 1, wherein the user input device is a wireless remote control.

6. The sink of claim 1, wherein the processor determines where in the video to present the CC text responsive to a location in the stream of a CC packet relative to a multimedia packet.

7. Assembly comprising:
    computer readable storage medium that is not a carrier wave and bearing multimedia data structures representing at least video for presentation of the video on a display of a sink device and closed caption (CC) data structures, the CC data structures not containing multimedia data and containing both information representing CC text that is to be presented on the display along with the video responsive to a user command received at the sink; and
    processor configured for accessing the medium to:
        source a stream of information including the CC data structures and multimedia packets representing the video to a sink through a digital media (DM) interface for presentation of the stream on the sink which determines whether to present the CC text with the video responsive to user commands input to the sink, a first number of bytes being included in a CC data structure for a first combination of multimedia frame rate and frame type, a second number of bytes being included in a CC data structure for a second combination of multimedia frame rate and frame type.

8. The assembly of claim 7, wherein each CC data structure includes a field indicating a number of bytes representing CC text in the CC data structure.

9. The assembly of claim 8, wherein each CC data structure includes a field carrying bytes representing CC text.

10. The assembly of claim 7, wherein the assembly is embodied in a source of multimedia and the processor accesses the medium to source the stream of information to a sink.

11. The assembly of claim 7, wherein the assembly is embodied in a TV and the processor receives the stream of information from the source to present the video on a display and to determine whether to present on the display the CC text with the video responsive to user commands input to the sink.

* * * * *